INVENTOR
J. MAURUSHAT, JR.
BY E J Olinder
ATTORNEY

MULTIFREQUENCY SIGNAL RECEIVER CIRCUIT

Filed May 11, 1964 5 Sheets-Sheet 4

May 9, 1967 J. MAURUSHAT, JR 3,319,011

MULTIFREQUENCY SIGNAL RECEIVER CIRCUIT

Filed May 11, 1964 5 Sheets-Sheet 5

United States Patent Office 3,319,011

Patented May 9, 1967

3,319,011

MULTIFREQUENCY SIGNAL RECEIVER CIRCUIT

Joseph Maurushat, Jr., Millburn, N.J., assignor to Bell Telephone Laboratories, Incorporated, New York, N.Y., a corporation of New York Filed May 11, 1964, Ser. No. 366,463
12 Claims. (Cl. 179—84)

This invention relates to multifrequency signaling systems and more particularly to multifrequency signal receivers and its general object is to increase the reliability of such receivers.

Multifrequency signaling is finding increasingly widespread use in the telephone plant. Such signals are now employed, for example, as station calling signals by subscribers equipped with pushbutton telephone subsets. Coded signals of this type typically comprise selected combinations of coincident two-tone bursts. One illustrative system employing multifrequency coded signals of the nature indicated is fully described in the January 1960 issue of the Bell System Technical Journal, 39 BSTJ 235.

In a telephone system employing multifrequency station calling signals, the central office equipment employs a multifrequency receiver to convert each tone pair into a pair of space division D.-C. signals, utilizing a 2×6 or a 4×4 code, and appropriate combinations of these D.-C. signals are used to initiate the operation of the central office switching equipment. A receiver of this general type is shown, for example, in United States Patent 3,076,-059, issued to L. A. Meacham and L. Schenker Jan. 29, 1963.

With the advent of electronic central office switching systems, the employment of multifrequency signaling has increased still further and is employed in certain instances for signaling both between central offices and in intraoffice signaling. A continuing problem in multifrequency receiving equipment, and a problem which has become increasingly difficult to solve in view of the higher speeds and therefore more rigid standards imposed by electronic switching, is the generation of apparently valid output signals in response to spurious input signals, such as speech or noise, for example, notwithstanding the use of a variety of combinations of signal validity tests. Prior art attempts to solve this problem have typically involved the use of circuitry that is disproportionately complex for the purpose intended and the results achieved have not been fully satisfactory.

A specific object of the invention therefore is to avoid actuating a multifrequency signal receiver by spurious input signals.

A further object of the invention is to subject incoming signals in a multifrequency signal receiver to a combination of validity tests without resort to complex circuitry.

These and other objects are achieved in one illustrative embodiment of the invention by the employment of a unique combination of signal validity tests, including a timing or signal duration test which is made substantially independent of the signal processing equipment. More specifically, in accordance with the principles of the invention, incoming signals are amplified by an automatic gain control amplifier and the signals, as amplified, are then applied by way of a first driving circuit to a bank of filters or tuned circuits. Each of the tuned circuits is responsive to a particular one of a group of preselected frequencies and the output of each of these tuned circuits is applied to an associated channel detector circuit. A substantially simultaneous direct current output from two of the channel detector circuits indicates that the incoming multifrequency signal did in fact include two of the preselected frequencies and accordingly a translation is effected from a single multifrequency signal to a pair of D.-C. space division outputs in terms of a 2×6 code.

One aspect of the invention involves the use of a second signal driver circuit, a guard frequency driver, to which amplified multifrequency input signals are also applied. A second bank of tuned circuits, forming a guard filter, is connected between the guard driver and ground, thus providing a low impedance shunt path to ground for each of the preselected frequency signaling components. In the absence of such components, however, and indeed whether or not such components are present, any incoming signal frequency which does not correspond to one of the preselected frequencies is applied to the channel detector circuits by the guard driver as an inhibiting bias, thus precluding a final output signal.

In accordance with another key aspect of the invention, each incoming multifrequency signal is applied directly to a separate validity test circuit which establishes a requirement for a minimum input signal duration before a system output signal may be accepted as valid. This validity test circuit rectifies the raw A.-C. signal and if the rectified signal persists for a predetermined period, it is applied to operate a signal gating device. At the same time, a signal comprising an output from at least two of the detector circuits must also be applied to the gating device. The resulting signal derived as an output from the gating device is used as a control signal to operate scanning equipment, such as a ferrod scanner, for example, to sample each detector output to determine the presence of an output signal. Although the combination of frequency testing and signal duration testing has been used heretofore, known systems have applied the signal duration test to signals rectified by the detectors. Consequently, in a conventional system the varying circuit parameters of the elements in each of the individual tuned circuits and in each of the individual detector circuits, results, in effect, in the application of a different timing standard to each signal frequency. In accordance with the invention, however, the timing function is made completely independent of frequency, which is to say that a timing test of unvarying accuracy is applied to each incoming signal regardless of frequency and as a result the possibility of spurious signals being accepted as valid is substantially reduced.

Accordingly, one feature of the invention pertains to a multifrequency signaling receiver employing a signal duration validity test based on the duration of the incoming multifrequency signal before processing by frequency selective elements.

Another feature relates to the employment of an electronic scanner in combination with a multifrequency receiver and an arrangement whereby the scanner is made responsive to an output from an incoming signal duration test circuit.

Another feature of the invention involves a multifrequency signaling receiver that tests the validity of incoming signals by a combination of uniquely related means which includes frequency selective circuits, guard frequency circuits, a signal duration test circuit that measures the duration of the incoming signal prior to its processing by frequency selective elements and an electronic scanner that senses the presence of an output signal in response to a control signal from the duration test circuit indicating an acceptable signal duration. The consequence of this feature is that no receiver output signal may be registered or finally accepted without the appearance of a pair of output signals on two of the output points and without the satisfactory completion of the essentially independent signal duration test.

The principles of the invention and additional objects and features thereof will be fully apprehended from the following detailed description of an illustrative embodiment and from the appended drawing in which.

Figure 1:
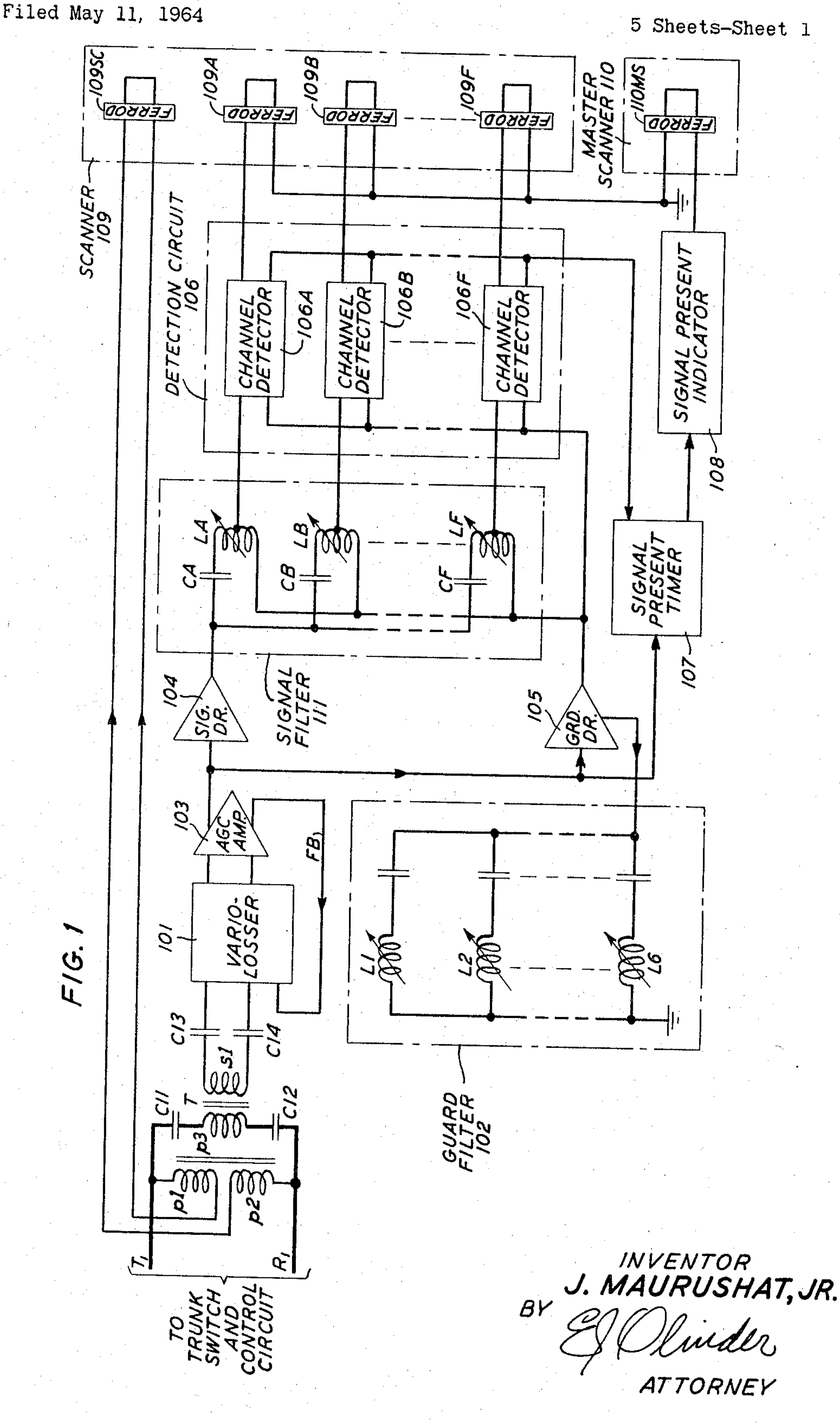
FIG. 1 is a block diagram of a multifrequency receiver in accordance with the invention.

As shown in FIG. 1, input signals to the receiver are applied from a trunk switch and control circuit by way of leads $T_1$ and $R_1$. Leads $T_1$ and $R_1$ apply the input signals across primary winding $p3$ of transformer T by way of coupling capacitors C11 and C12. The resulting signal induced in secondary S1 of transformer T is applied to the input of variolosser 101 by way of capacitors C13 and C14. The combination of automatic gain control amplifier 103 and variolosser 101 ensures amplified outputs of a substantially fixed magnitude.

One output from AGC amplifier 103 is applied by way of feedback path FB to variolosser 101. A second output from AGC amplifier 103 is applied to the input of a signal driver circuit 104, to a guard driver circuit 105 and to a signal present timer circuit 107. An output from guard driver 105 is in turn fed to guard filter 102 which includes a group of six series tuned circuits in parallel each comprising a respective one of the tuned inductors L1 through L6 and a respective one of the capacitors C1 through C6. Each of the tuned circuits in guard filter 102 provides a relatively low impedance path to ground for a respective one of a group of preselected signal frequencies. As a result, the output of guard driver circuit 105, which is applied to detection circuit 106, includes only signal frequency components outside of the preselected signal frequencies, provided, of course, that frequencies other than the preselected signal frequencies are included in the incoming signal from the trunk switch and control circuit.

Signal driver circuit 104 provides a driving means for each of the tuned circuits included in signal filter 111. Each of these tuned circuits includes a respective one of the tuned inductors LA through LF and a respective one of the capacitors CA through CF. Whenever valid signal frequency components are present, normally two such components are present in a bona fide input signal, an output signal from each of two of the tuned circuits in signal filter 111 is applied by the obvious path to a corresponding one of the channel detectors 106A through 106F in detection circuit 106.

Any output from guard driver circuit 105, which is indicative of the presence of nonsignalling frequencies in the input signal, is applied to each of the channel detectors 106A and 106F as an inhibiting signal. Stated otherwise, the function of guard driver 105 is to disable each of the channel detectors 106A through 106F in the event that spurious signal frequencies occur in an input signal. In the absence of any such spurious frequencies, a valid input signal results in a direct current output from each of two of the channel detectors 106A through 106F. Channel detector outputs are applied to a corresponding one of the ferrods 109A through 109F in electronic ferrod scanner 109. Such scanners are well known in the art and are described for example in the application of A. M. Guercio and H. F. May, Ser. No. 250,416, filed Jan. 9, 1963, now U.S. Patent No. 3,254,157.

Signal present timer 107 requires the application of each of two input signals to generate an output. First, a raw A.-C. input is received. If this input persists for a sufficient duration and further if the input from detection circuit 106 occurs before the termination of this duration, signal present timer 107 generates an output that is applied to signal present indicator circuit 108. A corresponding output from signal present indicator 108 in effect serves to inform master scanner 110 of the presence of a valid signal and master scanner 110, at that point, is operated to scan ferrods 109A through 109F in scanner 109 to determine which combination of two out of the six channel detectors 106A through 106F have been operated. In this fashion, translation from the two-out-of-six code is effected.

Figure 2A:
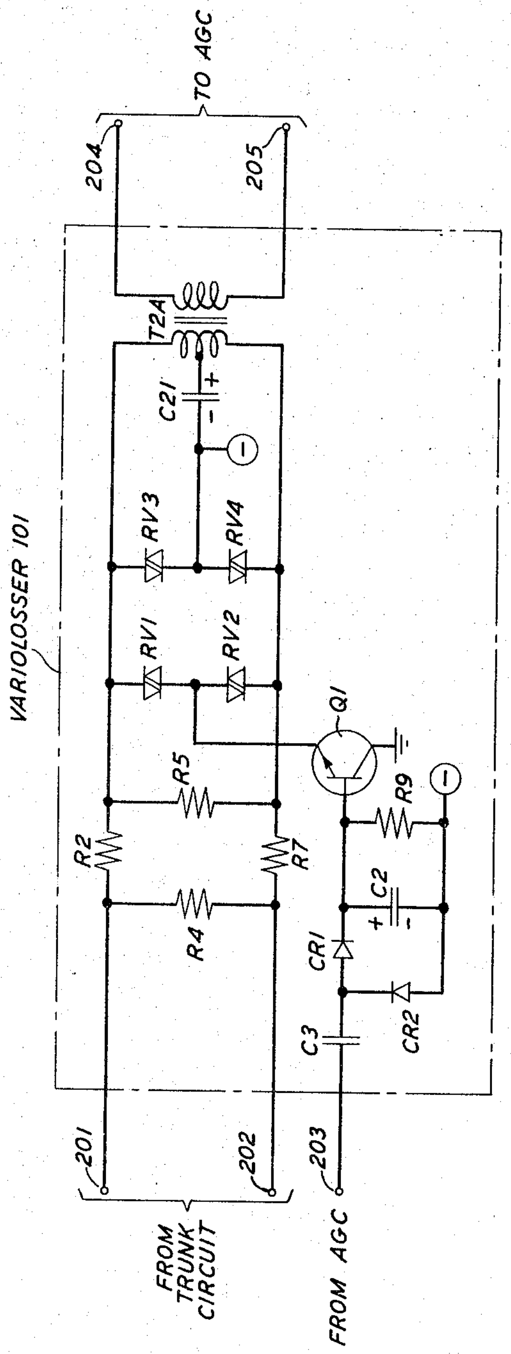
FIG. 2A is a schematic circuit diagram of the multifrequency variolosser shown in block form in FIG. 1.

The following discussions relate to details of circuit configuration and operation which are indicated only in block form in FIG. 1 and which have been described in general terms only in the preceding paragraphs. In variolosser 101, shown in detail in FIG. 2A, resistors R2, R4, R5 and R7 form a pad which provides a suitable termination for the trunk and which reduces the input signal to a level at which varistors RV1 through RV4 may operate properly. These varistors shunt the resistance pad output to a greater or lesser extent depending on the direct current through them which is supplied from the emitter output of transistor Q1. Diodes CR1 and CR2, capacitors C2 and C3 and resistor R9 form a voltage doubler, rectifier and filter which converts to D.-C. the A.-C. output applied to terminal 203 from automatic gain control amplifier 103. Capacitor C21 filters out any low frequency signal distortion. The output from variolosser 101 is coupled to output terminals 204 and 205 by way of transformer T2A.

Figure 2C:
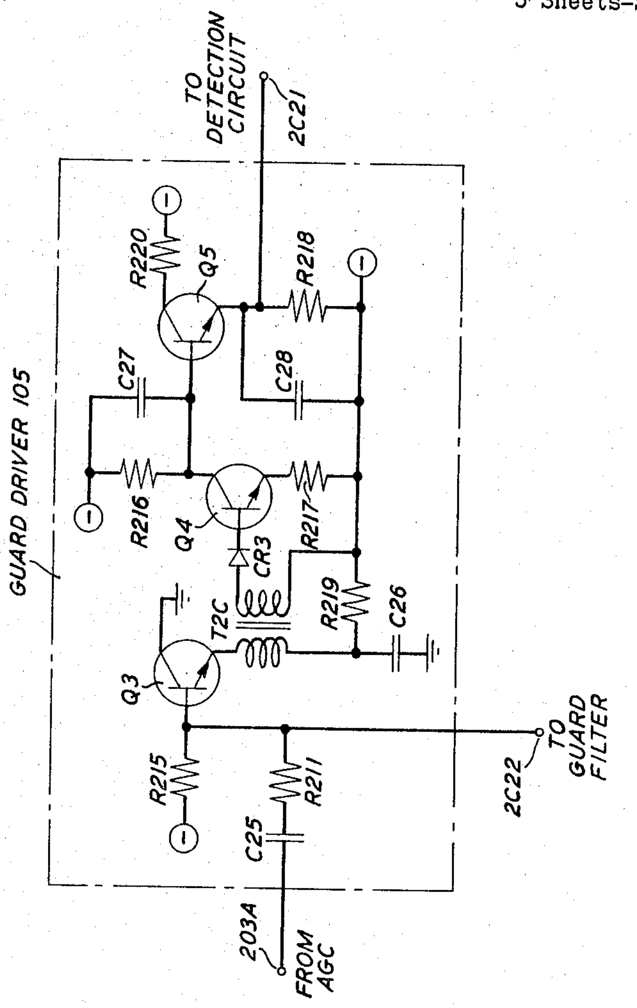
FIGS. 2B and 2C are schematic circuit diagrams of the signal driver and guard driver, respectively.
Figure 2B:
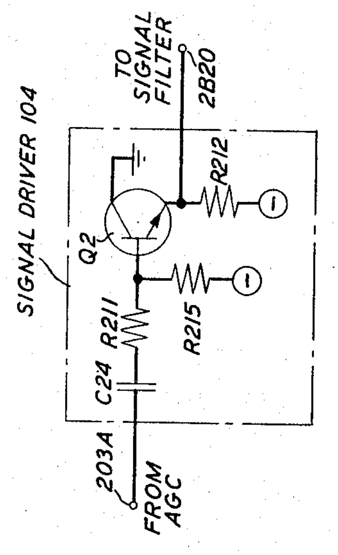

The signal driver circuit 104, shown in detail in FIG. 2B, employs as its active element transistor Q2 connected in emitter follower configuration. The output from AGC amplifier 103 which is applied to terminal 203A is coupled to the base of transistor Q2 by way of capacitor C24 and voltage divider resistors R211 and R215. The output from transistor Q2 is applied to output terminal 2B20 and thence, as shown in FIG. 1, to signal filter 111.

Guard driver circuit 105, shown in detail in FIG. 2C, also receives its input from terminal 203A, the output point of AGC amplifier 103. This input is applied to the base of transistor Q3 by way of capacitors C25 and R211. Guard driver 105 takes all voice frequency input signals except those shorted to ground by guard filter 102, couples them to transformer T2C through emitter follower transistor Q3 and applies the stepped-up signal voltages to the base of amplifier transistor Q4 through diode CR3. Resistor R216 and capacitor C27 provides a filtering action on the output of transistor Q4. Transistor Q5 serves as an output stage, coupling any signal rectified by transistor Q4 to output terminal 2C21. Diode CR3 protects the base emitter junction of transistor Q4 from any excessive back voltage.

Figure 3:
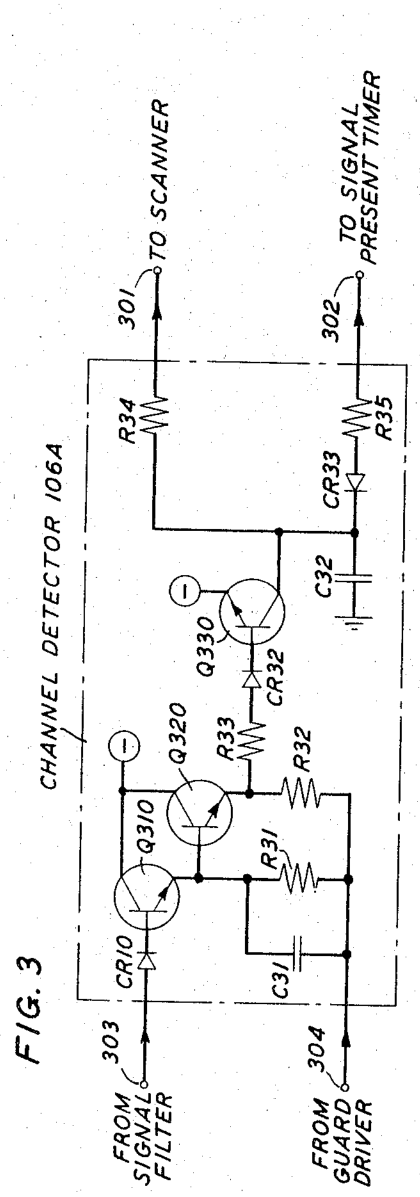
FIG. 3 is a schematic circuit diagram of one of the channel detector circuits.

An illustrative one of the channel detectors 106A is shown in schematic circuit diagram form in FIG. 3. The specific purpose of channel detector 106A is to operate in response to an A.-C. input signal delivered by one of the tuned circuits of signal filter 111, converting the A.-C. input to a D.-C. output suitable for operating the corresponding ferrod in the scanner. Input signals from signal filter 111 are applied to the base of transistor Q310 by way of input terminal 303 and diode CR10. Transistor Q310 rectifies the A.-C. input signal which is then further smoothed by a filter comprising capacitor C31 and resistor R31. Transistor Q320 couples the filter signal to transistor Q330. When the filter voltages, as seen from the emitter of transistor Q320, plus the bias voltage from guard driver 105, which is applied by way of input terminal 304, becomes more positive than some preselected level such as —27 volts for example, transistor Q330 conducts to draw current from ground via its associated ferrod 109A (shown in FIG. 1). Diodes CR10 and CR32 limit excessive reverse voltages across the base emitter junctions of transistors Q310 and Q330, respectively. Resistor R34 determines the magnitude of ferrod current to scanner 109 which is applied by way of terminal 301. Resistor R35, forming one branch of a parallel adding network, conducts the output current to signal present timer 107 by way of output terminal 302. Diode CR33 blocks back-up current to the other scanners. Capacitor C32 prevents the momentary release of transistor Q330 that might otherwise occur as the result of ripples in the output of transistor Q320.

Figure 4:
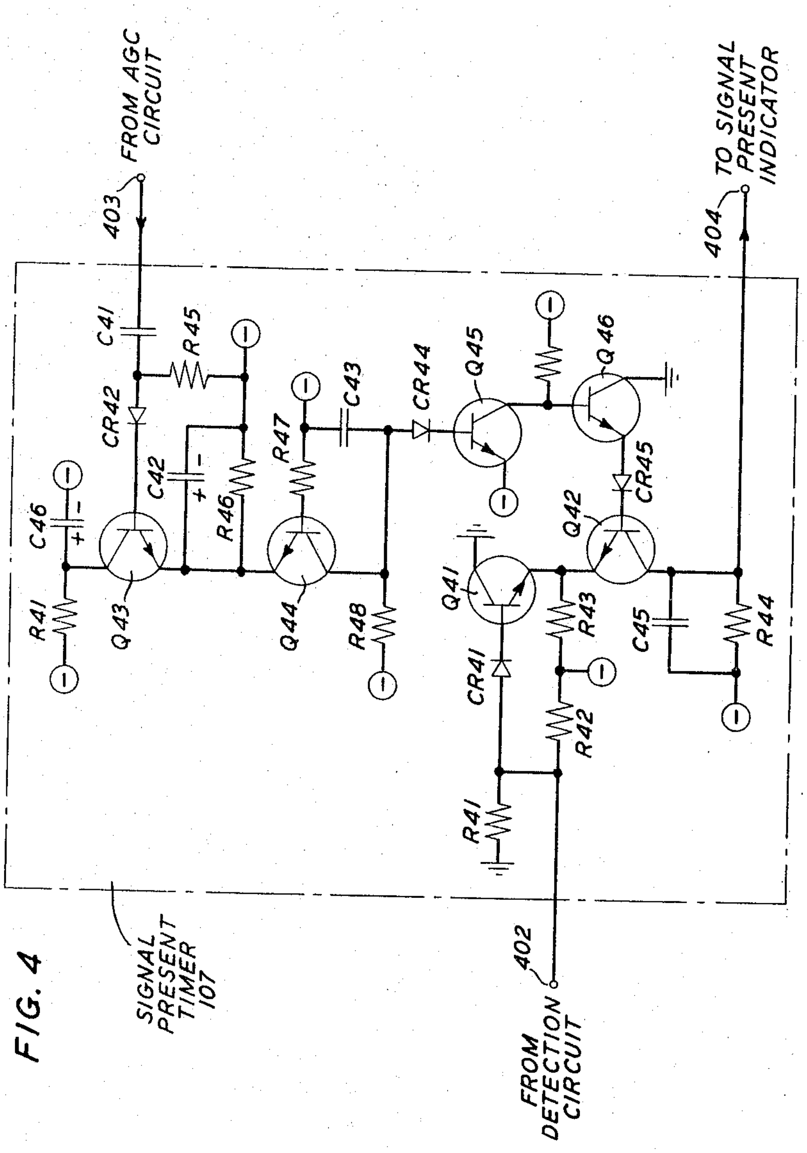
FIG. 4 is a schematic circuit diagram of the signal present timer circuit.

Signal present timer 107, which is shown in detail in FIG. 4, serves two distinct functions. First, it times the duration of any voice frequency signal above a preselected threshold level and activates one side of a gate if this signal persists. Second, if at least two multifrequency signaling frequencies are detected, the other side of the gate is activated and a signal present output is applied to signal present indicator 108. Inputs from amplifier 103 are applied from input point 403 to the base of transistor Q43 by way of capacitor C41 and diode CR42. The rectified output signal appearing on the emitter of transistor Q43 is filtered by the combination of capacitor C42 and resistor R46, and is in turn applied to the emitter of transistor Q44. When the emiter of transistor Q44 becomes more positive than some preselected level such as −27 volts, for example, transistor Q44 turns off. Its collector voltage rises as capacitor C43 charges through resistor R48.

After some preselected period such as 16 milliseconds for example, the voltage across capacitor C43 rises to a point where diode CR44 conducts, at which time transistor Q45 conducts and becomes saturated. This action changes the voltage on the base of transistor Q46 from a relatively low negative voltage such as −5 volts for example, to a level of approximately −15 volts. The resulting output on the emitter of transistor Q46 which is applied to transistor Q42 by way of diode CR45 fixes the potential on the base of transistor Q42 at a level which permits gating the output signal to output terminal 404 provided the emitter of transistor Q42 is suitably biased. When the D.-C. voltage on terminal 402 drops as a suitable multifrequency signal is received, the voltage on the emitter of transistor Q41 drops under the control of resistors R41 and R42.

If an A.-C. signal is present at terminal 403 for some preselected period such as 16 milliseconds or longer, the base of transistor Q42 is brought to a level of approximately −15 volts. When transistor Q41 lowers the emitter of transistor Q42 below −15 volts, transistor Q42 turns on and output terminal 404 is clamped to the emitter voltage of transistor Q42. If the A.-C. signal at terminal 403 has not been present for the required 16 milliseconds, or if as a result of some malfunction there is no A.-C. signal, the base of transistor Q42 is held close to −5 volts by emitter follower transistor Q46. This action holds terminal 404 to about −5 volts, thus preventing the passing of an output signal.

Diodes CR42, CR44 and CR45 protect the base-emitter junctions of transistors Q43, Q45, and Q42, respectively, from excessive back voltage. Resistor R41 and capacitor C46 limit and filter the collector current of transistor Q43.

Figure 5:
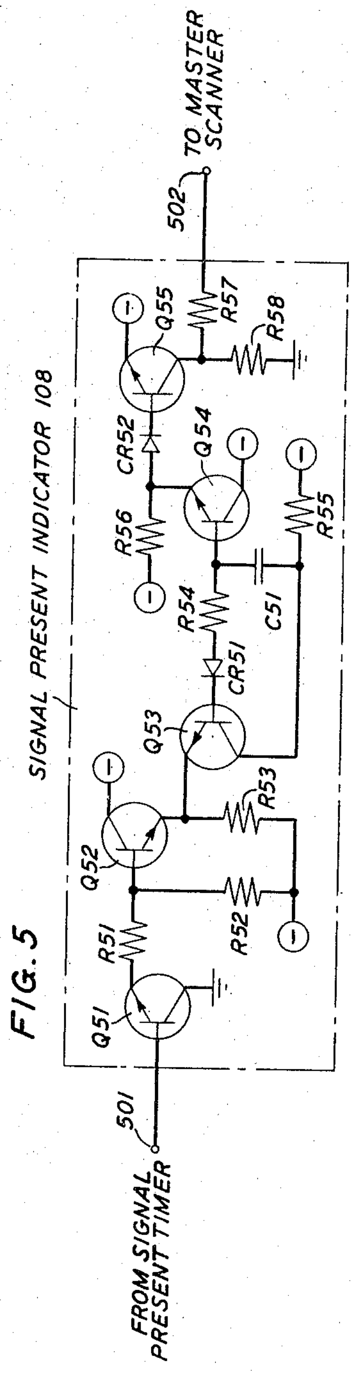
FIG. 5 is a schematic circuit diagram of the signal present indicator circuit.

Signal present indicator circuit 108 is shown in detail in FIG. 5. The primary purpose of this circuit is to activate ferrod 110MS in master scanner 110 to initiate the scanning process and thereby establish which of the ferrods 109A through 109F have been operated. The numerical identity of the corresponding incoming multifrequency signal is thus readily determined. Signal present indicator circuit 108 also provides a timing function which requires the incoming digit signal to be off for some period such as 22 milliseconds for example, before the ferrod no-signal state is restored. This arrangement prevents multiple registration of a digit when its envelope is broken up by short bursts of noise.

In operation, an input signal from signal present timer 107 is applied to the base of transistor Q51 by way of input terminal 501. Cascaded emitter follower transistors Q51 and Q52 are energized to turn on transistor Q53 whenever a signal-present input appears. Transistor Q54 couples the timing circuit comprising resistor R54 and capacitor C51 in the collector circuit of transistor Q53 and controls output transistor Q55. In the absence of an input signal, transistor Q55 conducts to saturate master scanner ferrod 110MS (FIG. 1 which is connected between terminal 502 and ground. When a signal present input drops the potential on the emitters of transistors Q51 and Q52 to the level on the emitter of transistor Q53, the emitter of transistor Q53 goes more negative than some preselected voltage such as −15 volts. Emitter follower transistor Q54, which tracks the collector voltage of transistor Q53, thus takes its emitter more negative than the emitter of transistor Q55 which turns transistor Q55 off. When the signal present input is removed, emitter voltages on transistors Q51 and Q52 go more positive to turn off transistor Q53. The base of transistor Q54, however, follows the voltage on capacitor C51 as capacitor C51 charges through resistor R55. After a period of time of some preselected duration which may be on the order of 22 milliseconds for example, the voltages at the base of transistors Q54 and Q55 reach the point at which transistor Q55 can again conduct and thereby generate an output signal. Diodes CR51 and CR52 protect the base emitter junctions of transistors Q53 and Q55, respectively, against excessive back voltage.

It is to be understood that the embodiment described herein is merely illustrative of the principles of the invention. Numerous other arrangements may be devised by persons skilled in the art without departing from the spirit and scope of the invention.

What is claimed is:

1. A multifrequency signal receiver for generating a pair of space division output signals in response to a single multifrequency input signal comprising, in combination, means including a first plurality of tuned circuits each responsive to a unique one of a group of preselected signal frequencies for generating a first A.-C. output signal, means including a plurality of detector circuits each responsive to one of said first A.-C. output signals for generating a corresponding D.-C. output signal, means responsive to a A.-C. input signal frequencies not included in said preselected signal frequencies for generating a guard bias voltage and for applying said guard bias to each of said detector circuits thereby to inhibit said detector circuits, means jointly responsive to one of said input signals persisting for a preselected duration and to a coincident output from at least two of said detector circuits occurring not later than the termination of said preselected duration for generating a control signal, and means responsive to said control signal for scanning the output of each of said detector circuits to sense the presence of said D.-C. output signals.

2. A multifrequency signal receiver comprising, in combination, a first plurality of tuned circuits each responsive to a unique one of a group of preselected signal frequencies for generating a first A.-C. output signal, means for applying multifrequency input signals including said preselected signal frequencies to said tuned circuits, means including a plurality of detector circuits each responsive to one of said A.-C. output signals for generating a corresponding D.-C. output signal, means responsive to frequencies other than said signal frequencies occurring in said input signals for generating a guard bias voltage and for applying said guard bias to each of said detector circuits thereby to inhibit said detector circuits, means jointly responsive to one of said input signals persisting for a preselected duration and to coincident outputs from at least two of said detector circuits occurring not later than the termination of said preselected duration for generating a control signal, and means responsive to said control signal for scanning the output of each of said detector circuits to sense the presence of said D.-C. output signals.

3. Apparatus in accordance with claim 2, said applying means including a first driver circuit for supplying power to drive said first tuned circuits, said generating means comprising a second driver circuit having an input point and an output point and means for diverting from said input point said preselected signal frequencies occurring in said input signals whereby said second driver circuit is enabled to supply said bias voltage to said detectors based only on signal frequencies other than said preselected frequencies occurring in said input signals.

4. Apparatus in accordance with claim 3 wherein said diverting means comprises a second plurality of tuned circuits.

5. A multifrequency receiver comprising, in combination, first and second signal driver circuits having a common input point and respective output points, means for applying multifrequency signals to said input points, a plurality of detector circuits, means including a first plurality of tuned circuits each connecting the output of said first driver circuit to the input of one of said detector circuits whereby each of said detector circuits is enabled to produce a D.-C. output signal upon the application of one of said multifrequency signals to said input point provided said last named signal includes a frequency component corresponding to said last named detector circuit, means including said second signal driver circuit responsive to the application of multifrequency signals to said input point for generating and applying a disabling bias voltage to each of said detector circuits, means rendering said last named means insensitive to the application of multifrequency input signals to said input point which signals include only frequency components corresponding to said first tuned circuits, signal validity test means for generating a control signal, means for applying said multifrequency signals from said input point to said test means, means for applying each of said D.-C. output signals to said test means, said test means being operatively responsive to the combination of one of said multifrequency signals that persists for a preselected period and the coincidence of at least two of said D.-C. signals provided said last named D.-C. signals occur not later than the termination of said last named multifrequency signals, and means responsive to said control signal for scanning the output of each of said dectector circuits to sense the presence of said D.-C. output signals.

6. Apparatus in accordance with claim 5 wherein said rendering means includes a second plurality of tuned circuits connected between said second signal driver circuit and a point of reference potential.

7. Apparatus in accordance with claim 5 wherein said test means comprises means for rectifying said multifrequency signal to produce an intermediate control signal, means for timing said intermediate control signal, and gating means responsive to said timing means for applying said D.-C. control signal to said scanning means.

8. A multifrequency receiver comprising, in combination, an input point and a plurality of output points, means for applying a multifrequency signal to said input point, means responsive to preselected frequency components in said multifrequency signals for applying a D.-C. signal to corresponding ones of said output points, guard frequency generating means responsive to frequency components other than said preselected components in said multifrequency signal for disabling said applying means, control signal generating means jointly and operatively responsive to one of said multifrequency signals persisting for at least a preselected duration and to the coincidence of at least two of said D.-C. signals occurring at said output points, said last named signals occurring before the termination of said duration, and means responsive to said control signal for utilizing said D.-C. signals applied to said output points.

9. Apparatus in accordance with claim 8 wherein said control signal generating means comprises means for rectifying one of said multifrequency input signals applied to said input point, means responsive to a rectified one of said input signals that exceeds a preselected voltage and a preselected duration for generating a gating signal, and a gating device jointly responsive to the coincident application of said gating signal and at least two of said D.-C. signals occurring at said output points for applying said control signal to said utilizing means.

10. Apparatus in accordance with claim 8 wherein said applying means includes an automatic gain control amplifier.

11. Apparatus in accordance with claim 9 wherein said utilizing means comprises an electronic scanning system.

12. Apparatus for translating a multifrequency signal including two out of a possible six preselected frequency components into a pair of space division D.-C. output signals comprising, in combination, an input point and a plurality of output points, means including a variolosser and an amplifier for applying a multifrequency signal to said input point, a plurality of detector circuits, means including a plurality of tuned circuits connecting said input point to each of said detector circuits, guard frequency generating means responsive to frequency components other than said preselected components in said multifrequency signal for disabling said applying means, control signal generating means jointly and operatively responsive to one of said multifrequency signals persisting for at least a preselected duration and to the coincidence of at least two of said D.-C. signals occurring at said output points, said last named signals occurring before the termination of said duration, and means responsive to said control signal for utilizing said D.-C. signals applied to said output points.

References Cited by the Examiner

UNITED STATES PATENTS

| | | | |
|---|---|---|---|
| 3,128,349 | 4/1964 | Boesch et al. | 179—84 |
| 3,140,357 | 7/1964 | Bischof et al. | 179—84 |

References Cited by the Applicant

UNITED STATES PATENTS

| | | |
|---|---|---|
| 2,468,305 | 4/1949 | Boesch et al. |
| 3,128,349 | 4/1964 | Newell. |

KATHLEEN H. CLAFFY, *Primary Examiner.*

H. ZELLER, *Assistant Examiner.*